United States Patent Office 2,898,259
Patented Aug. 4, 1959

2,898,259
UNSATURATED POLYESTER VINYLMONOMER, HETEROCYCLIC NITROGEN MONOMER AND METHOD OF PREPARING LAMINATED ARTICLE THEREFROM

Charles E. Wheelock, Bartlesville, Okla., assignor to Phillips Petroleum Company, a corporation of Delaware No Drawing. Application December 3, 1954
Serial No. 473,040

17 Claims. (Cl. 154—140)

This invention relates to a thermosetting resin and method of making same. In one of its aspects, it relates to thermosetting resins of exceptionally high flexural strength. In still another aspect, this invention relates to a new composition of matter resulting from polymerization of a blend of an unsaturated polyester resin with a monomer of the heterocyclic base of the pyridine or quinoline series and a second copolymerizable monomer.

With the rapid growth of the plastic molding industry, there is a constant search for new and improved resins. It is known to prepare thermosetting resins by the polymerization of an unsaturated polyester resin with a polymerizable compound containing a $CH_2=C<$ group. Various types of monomers have been employed in conjunction with the unsaturated polyester resins. In particular, casting resins based on unsaturated polyesters often contain monomeric styrene to improve castability, cure performance, or rigidity of the cured resin. However, the flexural strengths of these styrenated resins are not sufficiently high to make them economically attractive for many applications. Casting resins of this type are useful in the production of molding compositions and molded articles, as coating compositions for use in finishes for wood, metals, plastics, etc. and are especially useful as the binder in the production of laminated articles. However, the increased demand and use of laminates, calls for more and stronger bonding resins, particularly those having greater bonding strengths and imparting greater flexural strength to the laminate.

It is an object of this invention to produce new polymerizable and polymerized compositions. It is another object of this invention to provide a novel casting resin of high flexural strength. It is still another object of this invention to provide a laminate having high flexural strength. Other objects and advantages of this invention will be apparent upon reading this disclosure and the attached claims.

I have found that thermosetting resins of exceptionally high flexural strength can be prepared by polymerizing a blend of an unsaturated polyester resin, a monomer containing at least one $CH_2=C<$ group, and a polymerizable heterocyclic nitrogen base of the pyridine or quinoline series. Promoters, catalyst and/or quaternizing agents, as hereinafter described, can be used as desired. By proper choice of quaternizing agent in the presence of a suitable promoter, various shades and colors can be obtained.

When preparing the thermosetting resins of this invention, one of the monomers frequently used is styrene and the other is a vinylpyridine, such as 2-vinylpyridine, 2-methyl-5-vinylpyridine or similar compounds. While the invention is not dependent upon any particular procedure, one convenient method of operation comprises forming a homogeneous blend of the unsaturated polyester resin in the styrene, then adding the vinylpyridine component and, if desired, a promoter and a catalyst. Sometimes, a portion of the polyester resin in blended with the styrene and the remainder with the vinylpyridine and the two then blended together, along with the promoter and catalyst. In any case, the composition is then ready for molding, casting, extruding, production of laminates, etc. Curing, by application of heat, is then effected to give a thermoset product. A similar procedure is followed for other types of monomers.

The cast or molded composition can be cured at a temperature in the range of 25 to 200° C., a temperature in the range of 50 to 150° C. giving very good results. I have found that better wetting of the fabric is frequently obtained if the composition is allowed to stand at room temperature for a period of time up to 5 hours or even more prior to raising the temperature to the desired curing level. It will be understood by the polymer chemist that the cure time will vary, depending upon the composition, the temperature and the catalyst. Under some conditions, cure time can be as short as 10 minutes while under different conditions, the cure time can be 100 hours or even more.

The blended compositions, prior to curing, range from quite fluid to viscous liquids or soft pasty materials. Frequently a polymerization inhibitor is incorporated in the polymerizable materials prior to blending, since polymerization of these materials will sometimes occur at room temperature within a comparatively short time and premature polymerization would result in the absence of these inhibitors. These inhibitors are not necessarily separated out prior to blending. Inhibitors, such as phenyl - beta - naphthylamine, hydroquinone, tert - butyl catechol, resorcinol, and the like, are suitable. These inhibitors are employed in small amounts, generally less than 1 percent by weight, based on the total composition and frequently between 0.01 and 0.2 weight percent is considered sufficient.

The effect of the inhibitor carried over into the blend may be overcome by the addition of a catalyst and a promoter. Promoters include materials such as metal salts, e.g., cobalt, iron, manganese or lead, in the form of naphthenates or other salts. Other promoters are amine-type compounds such as ethanolamine, diethanolamine, triethanolamine, diethylenetriamine, tributylamine, and the like.

Catalysts employed are generally of the peroxide type, such as benzoyl peroxide, tert-butyl perbenzoate, tert-butyl hydroperoxide, cumene hydroperoxide, cyclohexanone peroxide, etc. The catalyst is generally added to the composition just prior to the processing step, such as molding, casting, etc.

The amount of catalyst employed is such that the composition will remain fluid for the length of time required for the processing step. Whatever catalyst is chosen, the amount used is that which will give the desired gel time. Those skilled in the art will be familiar with such methods. Gel time will, of course, depend upon the conditions under which the composition is used. The composition should remain fluid for a time sufficient to form the article and this time will be different say for a laminate than it would be for a molded article. In general, the amount of catalyst is regulated to give a gel time between 1 and 30 minutes.

Gel time is a measure of the reactivity of a system. This test is made according to the tentative specifications drawn up by the Reinforced Plastics Division of the Society of the Plastics Industry (referred to in the Examples as SPI method). The test involves filling a 19 mm. x 125 mm. test tube with three inches of catalyzed resin and inserting a thermocouple of a recording potentiometer in the center of the resin and placing the tube in a constant temperature bath at 180° F. The resin temperature begins to rise, polymerization starts as an exothermic reaction and the resin temperature rises to a maximum. The temperature is plotted against the time and the gel time is the time interval for the temperature to rise from 150 to 190° F. and the cure time is the time from 150° F. to the peak of the exothermic curve.

Gel time and cure time data shown in the examples were obtained from the same determination and the SPI procedure followed except that an aneroid thermometer was used instead of a thermocouple.

The unsaturated polyester resins useful in this invention are prepared by the reaction of polyhydric alcohols with unsaturated polycarboxylic acids and are preferably produced by the esterification of an alpha, beta unsaturated dicarboxylic acid with a glycol.

The polyhydric alcohols with which we are primarily concerned are glycols or mixtures of glycols (two hydroxy groups per molecule) and they will generally contain no more than 15 carbon atoms per molecule. Examples of such glycols include ethylene glycol, propylene glycol, diethylene glycol, α-butylene glycol, β-butylene glycol, tetramethylene glycol, triethylene glycol, hexamethylene glycol, diphenyl propane diol, etc. Also included in such glycols are those glycols which are derivatives of polyhydroxy alcohols containing 3 or more hydroxy groups wherein the hydroxy groups in excess of 2 have been reacted such as by etherification or esterification with a saturated monocarboxylic acid, for example, acetic acid. Small amounts of more highly hydroxylated materials, e.g., compounds containing up to six hydroxy groups per molecule, may be present and will be desirable in some instances. Examples of such alcohols containing three or more hydroxy groups include glycerol, erythritol, pentaerythritol, ribitol, sorbitol, allitol, inositol, scyllitol, etc. These latter polyhydric alcohols can comprise up to 5 percent of the total polyhydric alcohol without any adverse effects. Alcohols containing only one hydroxy group per molecule may also be present but it is to be understood that the total amount of alcohol other than glycols is not generally used in an amount exceeding 5 weight percent of the total alcohol. Examples of such mono hydroxy alcohols include methyl alcohol, ethyl alcohol, n-propyl alcohol, isopropyl alcohol, sec-butyl alcohol, tert-butyl alcohol, isoamyl alcohol, octyl alcohol, myristyl alcohol, benzyl alcohol, cyclohexanol, furfuryl alcohol, etc.

When the more highly hydroxylated compounds are used, the polyester resins have a tendency to gel and it is, therefore, generally desirable to keep these materials at a minimum. On the other hand, the monohydric alcohols serve as chain terminators and, if used in too large quantities, will give products with undesirably low molecular weights.

The polycarboxylic acids with which this invention is primarily concerned are unsaturated dicarboxylic acids preferably alpha, beta-unsaturated dicarboxylic acids generally containing not more than 15 carbon atoms per molecule. Such acids include maleic, fumaric, itaconic, citraconic, mesaconi, ethylmaleic, methylethylmaleic, diethylmaleic, glutaconic, alpha-methylglutaconic, alpha, alpha'-dimethylglutaconic, beta-methylglutaconic, alpha, alpha-dimethylglutaconic, alpha,beta,gamma - tributylglutaconic, 1,3-dihydromuconic, 2-octenedioic, 2-heptenedioic, 2-pentadecenedioic and similar dicarboxylic acids. Also included in such polycarboxylic acids are those dicarboxylic acids which are derivatives of polycarboxylic acids of more than 2 carboxy groups wherein the carboxy groups in excess of 2 have been reacted such as having been reacted with a monohydric alcohol. In addition to the alpha,beta-unsaturated acids, certain modifying acids can be used. These modifying acids can contain up to 20 carbon atoms per molecule and include saturated dicarboxylic acids, saturated or unsaturated monocarboxylic acids, tricarboxylic acids, aromatic mono- and polycarboxylic acids. In the case of the saturated dicarboxylic acids, they can be used in an amount up to and including 25 weight percent of the total acid, provided that the total of all modifying acids (i.e., those other than alpha, beta-unsaturated dicarboxylic acids) do not exceed this 25 percent limitation. In the case of all other modifying acids, the amount will not generally exceed 5 weight percent. Examples of these modifying acids are phthalic, terphthalic, mellitic, tricarballylic, formic, acetic, propionic, butyric, isobutyric, valeric, caprylic, pelargonic, capric, myristic, stearic, arachidic, oleic, acrylic, ethacrylic, benzoic, toluic and salicyclic acids.

Like the alcohols, the polycarboxylic acids containing more than 2 carboxy groups tend toward gel formation, whereas the monocarboxylic acids are chain breakers.

It is within the scope of this invention to use a mixture of alcohols and a mixture of acids or a mixture of either. In general, the acids and alcohols selected will be so chosen so as to produce polyester resins having a molecular weight no greater than 8000. It is also within the scope of this invention to halogenate or substitute other non-interfering groups on the polyester resin.

The monomeric materials other than the basic nitrogen containing monomers which are applicable in this invention are those monomers containing a $CH_2=C<$ group but containing no conjugated aliphatic carbon-to-carbon double bonds. That is, the resins of this invention have very high flexural strengths, while those monomers containing aliphatic conjugated carbon to carbon double bonds tend to form elastomers rather than the more rigid products of this invention. By having no conjugated aliphatic carbon-to-carbon double bonds, it is meant that no groups of the following type are included: $-C=C-C=C-$. To say it in another way, the $CH_2=C<$ group is an active polymerizable group in which the double bond is not in conjugated relation to a second aliphatic carbon-to-carbon double bond. In general, this third type monomer will be selected from the group consisting of aromatic hydrocarbons having at least one $CH_2=C<$ substitutent and nonconjugated aliphatic and nonconjugated substituted aliphatic copolymerizable monomers having at least one $CH_2=C<$ group. Typical monomers include styrene, chlorostyrene, dichlorostyrene, alkylstyrenes, alpha-methylstyrene, vinylnaphthalenes,diallyl phthalate, diallyl maleate, diallyl fumarate, diallyl succinate, ethyl vinyl ether, dialyl ether, methallyl ethyl ether, methyl vinyl ketone, divinyl ketone, methyl allyl ketone, methyl acrylate, ethyl acrylate, methyl methacrylate, acrylonitrile, methacrylonitrile and the like.

The heterocyclic nitrogen base monomers which are applicable in this invention are monomers of the pyridine and quinoline series. Those pyridines and quinolines generally used are those derivatives of pyridine or quinoline containing at least one $$CH_2=\overset{R}{C}-$$

substitutent where R is either hydrogen or methyl group, i.e., the substituent is either a vinyl or an isopropenyl group. The pyridine and quinoline compounds which are preferred are those having only one such $$CH_2=\overset{R}{C}-$$

substituent wherein R is either vinyl or isopropenyl and of these compounds, those belonging to the pyridine series are most frequently used. Various alkyl and aryl-substituted derivatives are also applicable, but it is generally preferred that the total number of carbon atoms in the nuclear-substituted alkyl and aryl groups should not be greater than 12 and most frequently, these alkyl groups are methyl and/or ethyl. Examples of such compounds are 2-vinylpyridine; 3-vinylpyridine; 4-vinylpyridine; 2,4,6-trimethyl-5-vinylpyridine; 3,4,5,6-tetramethyl-2-vinylpyridine; 3-ethyl-5 - vinylpyridine; 2 - methyl - 5-vinylpyridine; 2,6-diethyl-4-vinylpyridine; 2-isopropyl-4-nonyl-5-vinylpyridine; 2-methyl-5-undecyl - 6 - vinylpyridine; 3-dodecyl-2,4-divinylpyridine; 2,4-diethyl - 5,6 - diphenyl-3-vinylpyridine; 3,5 - di(alpha-methylvinyl)pyridine; similar mono- and di-substituted vinyl and isopropenyl pyridines; and like quinolines.

The amount of unsaturated polyester resin will usually be used in the range between 10 and 90 parts by weight per 100 parts of total polymerizable material and more preferably between 30 and 80 parts by weight. The remaining polymerizable material comprises the two types of monomers hereinbefore described and wherein 2 to 90 weight percent of this remaining polymerizable material is heterocyclic nitrogen base.

A quaternizing agent can be included in the resinous composition to good advantage. The quaternizing agent, provided it does not form a stable free radical thus using up the catalyst, promotes gelation and cure of the composition. When these quaternizing agents are used with a cobalt salt, the quaternizing agents provide pleasing color effects in the resin formulation. When a quaternizing agent is used, it is employed in an amount in the range between 2 and 100 mol percent based on the basic nitrogen units in the composition. The amount of quaternizing agent employed will depend largely upon the type of product desired.

Suitable quaternizing agents include the various alkyl halides, such as methyl iodide, methyl bromide, ethyl iodide, propyl iodide, hexyl iodide, nonyl bromide, cetyl bromide; the various alkylene halides, such as ethylene iodide, ethylene bromide, propylene chloride, butene bromide, octene bromide; the various substituted alkanes and cycloalkanes necessarily including the above alkyl and alkylene halides which contain at least one hydrogen atom attached to a carbon atom, such as bromoform, chloroform, 1,2-dibromobutane, ethylene chlorohydrin, cetyl chloride, iodoform, chloroacetyl chloride; alkyl sulfates, such as methyl sulfate, ethyl sulfate; and the various substituted aromatic compounds, such as picryl chloride, benzoyl chloride, benzene sulfonyl chloride, benzyl chloride, benzal chloride, benzotrichloride, and methyl benzene sulfonate. Other materials which may be employed as quaternizing agents in the practice of this invention include the various polyhalogenated cycloalkenes, such as hexachlorocyclopentadiene. The foregoing enumeration is not intended to include all the possible suitable quaternizing agents, but is only representative since many others may be used. If an organic compound contains an active halogen atom attached to a carbon atom or contains a similar active quaternizing group and if the compound is not an acid, it is useful in this invention. In general, active quaternizing agents, such as organic halides, organic sulfates, and organic acid chlorides and the like, which contain not more than 20 carbon atoms per molecule and contain at least one halogen or equivalent quaternizing group, for example, an alkyl arylsulfonate, an aryl alkylhalide, an alkyl sulfate or the like, are satisfactory in the practice of this invention. Those compounds which contain the configuration

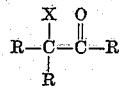

or

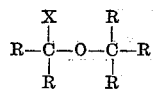

wherein X is a halogen atom such as chlorine, bromine and iodine and the R's represent oxygen, hydrogen, or carbon valance linkages to their respective carbon atoms which contain not more than 20 carbon atoms are especially useful.

To further explain my invention and to illustrate its advantages, the following examples are given. In some of these examples, an alkyd or polyester resin obtained from Atlas Powder Company, namely Atlac-LV[1] and Atlac-382,[1] were used. Such resins can be prepared by esterifying dihydric alcohols with equimolar quantities of a dicarboxylic acid and in the presence of a highly chlorinated modifying acid, such as trichloroacetic acid (see U.S. 2,634,251).

[1] A trademark of Atlas Powder Company.

An analysis of these alkyd or polyester resins gave the following results.

|  |  | Atlac-LV | Atlac-382 |
|---|---|---|---|
| Carbon | percent | 55.20 | 69.10 |
| Hydrogen | do | 4.49 | 7.00 |
| Oxygen | do | 31.80 | 24.90 |
| Chlorine | do | 10.42 | 1.41 |
| Acid No | | 13.34 | |
| Saponification No | | 542 | |
| Molecular Weight | | 2,697 | |
| Empirical Formula | | $C_{80}H_{60}O_{27}Cl_4$ | |

From the above analysis, it is seen that Atlac-LV is more highly substituted with chlorine than is the Atlac-382. These values are those determined by analysis and do not total exactly 100 percent. 2-methyl-5-vinylpyridine in the following examples is frequently referred to as MVP.

Example 1

Several thermosetting resins were prepared using an unsaturated polyester resin of commercial origin (Atlac-LV), styrene and 2-methyl-5-vinylpyridine, together with cobalt naphthenate as a promoter and tert-butyl perbenzoate as a catalyst. A homogeneous blend of the unsaturated polyester resin with the styrene was first prepared at room temperature (approximately 23° C.) and the 2-methyl-5-vinylpyridine was then added. A small amount of phenyl-beta-naphthylamine was present in the styrene and 2-methyl-5-vinylpyridine making a total of 0.02 part by weight per 100 parts material in the blend. To this liquid blend, 0.504 part by weight cobalt naphthenate was added. In addition to the several blends containing the unsaturated polyester, styrene and 2-methyl-5-vinylpyridine, one composition was prepared using the unsaturated polyester and styrene but no 2-methyl-5-vinylpyridine. An attempt was made to prepare a laminate using 65 parts by weight of the polyester resin and 35 parts by weight of 2-methyl-5-vinylpyridine. When the material was blended at room temperature, the mixture gelled before a laminate could be prepared.

The liquid blends, prepared as described above, were employed for the production of laminates using 12 plies of a woven glass fabric (Fiberglas ECC 181-114[2]), 12 inches by 12.5 inches, placed upon a stainless steel plate.[3] Each liquid blend was divided into 13 portions of approximately the same volume and, just prior to use, a predetermined amount of catalyst was added to each portion. The approximate weight of each portion is indicated in the table. The first portion was placed upon a plate and a layer of glass fabric was placed on the blend and pressed into the liquid so as to cause the liquid to work up through the fabric. Another portion of the liquid blend was then added and spread over the fabric and this followed by another layer of glass fabric and the procedure continued until all the required number of plies had been impregnated. A second steel plate was laid upon the top of the thus assembled layers and the plate was secured to the bottom plate by means of clamps and shims to provide the desired thickness for the laminated structure. In each of these runs, the space between the steel plate was such that the resin composition was approximately 50 weight percent of the finished laminated structure. Each laminate thus prepared was allowed to stand for several hours at 23° C., after which it was cured at elevated temperatures as shown by the table. The following table shows the composition of the various resins, treatment of the laminates and their flexural strengths.

[2] This is Owens-Corning ECC 181-114 Fiberglas woven into cloth by the Monroe-Ducore Company.
[3] A parting agent such as CD-mold release was used on the stainless steel plates to prevent the laminate from sticking to the plate.

| Composition of Liquid Blend, Parts by Weight | | | Catalyst[1] | | Gel[4] Time, Min. | Liquid Blend Per Ply | | Time at 23 C., Hours | Initial Cure | | Flexural Strength After Initial Cure, p.s.i. | Flexural Strength after Post Cure at 100 C., p.s.i. | | |
|---|---|---|---|---|---|---|---|---|---|---|---|---|---|---|
| Sample No. | Atlac LV | Styrene | 2-Methyl-5-vinyl-pyridine | Type | Amount, Gms.[3] | | Ml. | Gms. | | Hrs. Time | Temp., C. | | 48 Hrs. | 72 Hrs. | 96 Hrs. |
| 1 | 65 | 35 | 0 | Lupersol DDM[2] | 0.118 | 2 | 50 | | | 15 | 80–83 | 35,967 | 36,260 | | 36,567 |
| 2 | 65 | 34 | 1 | tert-butyl perbenzoate | 0.455 | | 40 | 46.44 | 22 | 18 | 82 | 40,700 | | | 44,600 |
| 3 | 65 | 30 | 5 | do | 0.455 | | 40 | 46.56 | 4.5 | 11.5 | 82 | 47,600 | | 48,600 | |
| 4 | 65 | 25 | 10 | do | 0.409 | >22 | 40 | 46.84 | 4.5 | 13 | 82 | 54,933 | | | 49,533 |
| 5 | 65 | 20 | 15 | do | 0.455 | 33 | 40 | 47.08 | 5.5 | 10.5 | 80 | 54,266 | 50,100 | | |
| 6 | 65 | 15 | 20 | do | 0.569 | >22 | 40 | 47.40 | 5 | 12 | 82 | 59,366 | 53,500 | | |
| 7 | 65 | 10 | 25 | do | 0.409 | 40 | 40 | | | 4.5 | 15.5 | 80 | 48,300 | 47,200 | | |

[1] The amount of catalyst chosen is that quantity required to produce a predetermined gel time. For this reason, gel time is considered of greater significance than catalyst type or quantity.
[2] Methyl ethyl ketone peroxide in dimethyl phthalate.
[3] Grams catalyst per aliquot of blend used for each ply in making the laminate.
[4] Gel time determined by method of Society of Plastics Industries.

From the above data, it can be seen that as low as one part 2-methyl-5-vinylpyridine per 100 parts of blend improved the flexural strength markedly. In general, as the parts pyridine increased, the flexual strengths increased, however, after the 10 parts per hundred parts had been added, the rate of strength increase is not so pronounced and in fact dropped off when the MVP content was raised to 25 parts per 100 parts blend. In all cases the parts polyester resin is the same.

*Example II*

A thermosetting resin was prepared using the following starting materials:

| | Parts by weight |
|---|---|
| Unsaturated polyester resin (Atlac–LV) | 65 |
| Styrene | 30 |
| 2-vinylpyridine | 5 |
| Cobalt naphthenate | 3 |

The materials were blended in the manner described in Example I and a clear solution was obtained. This liquid blend was employed for the production of a laminate using 12 plies of a woven glass fabric (Fiberglas ECC 181–114), 6 inches by 6 inches. A total of 160 ml. of the liquid blend was used and 9 drops of tert-butyl perbenzoate (0.205 gm.) was added to each portion applied. The same procedure was employed as in Example I. The laminate was allowed to stand in the mold at room temperature (approximately 23° C.) for 3.5 hours and was then cured at 80° C. for 17.5 hours. The product had a flexural strength of 63,500 p.s.i. This example shows the high flexural strengths obtained when 2-vinylpyridine is used in the resinous portion of the laminate.

*Example III*

The following example is given to illustrate the effect MVP (2-methyl-5-vinylpyridine) has on viscosity of the blend. All quantities are in parts by weight.

| Polyester | Amount | Styrene | MVP | Cobalt naphthanate | Phenyl-beta-naphthyl-amine | Viscosity (SFS at 100° F.) |
|---|---|---|---|---|---|---|
| Atlac LV | 65 | 35 | | 0.504 | 0.03 | 1,044 |
| Do | 65 | 25 | 10 | 0.504 | 0.02 | 897 |
| Do | 65 | 20 | 15 | 0.504 | 0.02 | 1,200 |
| Atlac 382 | 65 | 35 | | 0.504 | | ([1]) |
| Do | 65 | 30 | 5 | 0.504 | | 7,634 |
| Do | 65 | 25 | 10 | 0.504 | | 6,431 |
| Do | 65 | 20 | 15 | 0.504 | | 7,123 |
| Do | 65 | 15 | 20 | 0.504 | | 7,899 |

[1] Too viscous to use.

From the foregoing table, it appears that the viscosity drops to a minimum as MVP is added and then increases.

*Example IV*

This example is given to show the effect of a quaternizing agent on gel time and color of the resin. Laminates were prepared as in Example I.

| Polyester | | Styrene[1] | MVP[1] | Promoter Cobalt Naphthenate[1] | Quaternizing Agent | | Time, Min. | | Color | Catalyst t-butyl perbenzoate[3] |
|---|---|---|---|---|---|---|---|---|---|---|
| Type | Amount[1] | | | | Benzal Chloride[2] | Diethyl Bromo[2] malonate | Gel | Cure | | |
| Atlac LV | 65 | 35 | 0 | 0.18 | | | 18 | 32 | Tan-pink | 0.455 |
| Do | 65 | 30 | 5 | 0.18 | | | 26 | 38 | Slate Blue | 0.685 |
| Do | 65 | 30 | 5 | 0.18 | 0.2 | | 7 | 33 | Forrest Green | 0.445 |
| Do | 65 | 30 | 5 | 0.18 | 0.6 | | 7 | 27 | Olive Green | 0.445 |
| Do | 65 | 30 | 5 | 0.18 | 1.0 | | 8.5 | 24 | Dark Olive Green | 0.683 |
| Do | 65 | 30 | 5 | 0.18 | | 0.2 | 28 | 58 | Aqua-Marine | 0.455 |
| Do | 65 | 30 | 5 | 0.18 | | 0.6 | 38 | 52 | Blue Aqua Marine | 0.455 |
| Do | 65 | 30 | 5 | 0.18 | | 1.0 | 9 | 54 | Green Blue | 0.455 |
| DGMA[a] | 65 | 35 | 0 | 0.18 | | | 25 | 38 | Tan-Pink | 0.228 |
| Do | 65 | 30 | 5 | 0.18 | | | 30 | 61 | Blue Purple | 0.228 |
| Do | 65 | 30 | 5 | 0.18 | 0.2 | | 19 | 34 | Green | 0.228 |
| Do | 65 | 30 | 5 | 0.18 | 0.6 | | 14 | 24 | Olive Green | 0.228 |
| Do | 65 | 30 | 5 | 0.18 | 1.0 | | 12 | 22.5 | Olive | 0.228 |

[1] Parts by weight.
[2] Ratio mols quaternizing agent to mols MVP.
[3] Weight in grams for each aliquot per ply.
[a] Diethylene glycol maleate adipate.

The foregoing data shows the effect of a quaternizing agent on color as well as gel and cure time. The less active benzal chloride appears to retard the gel and cure time while the more active diethyl bromomalonate accelerated these properties. For resins containing MVP and by the proper choice of quaternizing agent and promoter numerous colors and shades of blue and green are obtained.

Example V

This example is used to illustrate that the presence of MVP in the formulation has a very significant effect in increasing bonding strength with no detrimental effect on impact strength. Laminates were prepared by the same method as is described under Example I.

| Laminating Resin, Parts by Weight | | | Impact (Izod)[1] | Bonding Strength (p.s.i.) |
|---|---|---|---|---|
| Atlac LV | Styrene | MVP | | |
| 65 | 35 | ---- | 40.68 | 1,496 |
| 65 | 20 | 15 | 40.85 | 1,750 |

[1] ASTM D256-47T (a cantilever beam test).

Example VI

A series of laminates prepared according to the procedure of Example I using various ingredients and treatments were tested and the data given in the following table.

| Run No. | Inhibitor, PBN[1] (Parts) | Promoter, Cobalt Naphthanate (Parts) | SPI[2] Gel Time (Min.) | Cure Time (Min.) | Monomer Parts | | | | Atlac-LV (Parts) |
|---|---|---|---|---|---|---|---|---|---|
| | | | | | Styrene | MVP[3] | Butyl Methacrylate | 2-Vinyl Pyridine | |
| 1 | 0.325 | 0.504 | | | 35 | | | | 65 |
| 2 | | 0.504 | 3 | 5 | 35 | | | | 65 |
| 3 | 0.02 | 0.504 | | | 34 | 1 | | | 65 |
| 4 | 0.02 | 0.504 | 32 | 50 | 30 | 5 | | | 65 |
| 5 | 0.02 | 0.504 | 22 | 33 | 25 | 10 | | | 65 |
| 6 | 0.02 | 0.504 | 33 | 43 | 20 | 15 | | | 65 |
| 7 | 0.02 | 0.504 | between 23-49 | between 30-65 | 15 | 20 | | | 65 |
| 8 | 0.02 | 0.504 | 40 | 66 | 10 | 25 | | | 65 |
| 9 | 0.02 | 0.504 | 2 | 5 | 35 | | | | 65 |
| 10 | 0.02 | 0.504 | 5 | | 35 | | | | 65 |
| 11 | 0.02 | 0.504 | 1.5 | 2.5 | | | 35 | | 65 |
| 12 | 0.02 | 0.504 | 37 | 52 | | 15 | 20 | | 65 |
| 13 | 0.02 | 0.504 | 21 | 36 | | 25 | 10 | | 65 |
| 14 | | 0.18 | 12 | 42 | 30 | | | 5 | 65 |
| 15 | | 0.18 | 26 | 38 | 30 | 5 | | | 65 |

ATLAC-382

| 16 | | 0.504 | 1.5 | 5 | 30 | 5 | | | 65 |
| 17 | | 0.504 | 1.5 | 7.5 | 25 | 10 | | | 65 |
| 18 | | 0.504 | 1.0 | 10 | 20 | 15 | | | 65 |
| 19 | | 0.504 | | | 15 | 20 | | | 65 |

| Run No. | Catalyst (gms./ply) | | Ml./ply | Treatment | | | Flexural Strength (p.s.i.) | Post Cure | | |
|---|---|---|---|---|---|---|---|---|---|---|
| | Lupersol DDM | t-Butyl Perbenzoate | | Room Temp. (Hrs.) | Oven | | | Hrs. | Temp. (°C.) | Flex Strength (p.s.i.) |
| | | | | | Time (Hrs.) | Temp. (°C.) | | | | |
| 1 | 0.118 | | 50 | | 15 | 80 | 36,000 | 96 | 100 | 36,600 |
| 2 | | 0.455 | 40 | 28¾ | 17.5 | 83 | 39,500 | 96 | 100 | 43,400 |
| 3 | | 0.455 | 40 | 22 | 18 | 82 | 40,700 | 96 | 100 | 44,600 |
| 4 | | 0.455 | 40 | 4.5 | 11.5 | 82 | 47,600 | 72 | 100 | 48,600 |
| 5 | | 0.409 | 40 | 4.5 | 13 | 82 | 54,900 | | | |
| 6 | | 0.455 | 40 | 5.5 | 10.5 | 80 | 54,300 | | | |
| 7 | | 0.569 | 40 | 5.0 | 12 | 82 | 59,400 | | | |
| 8 | | 0.409 | 40 | 4.5 | 15.5 | 80 | 48,300 | 48 | 100 | 47,200 |
| 9 | | 0.455 | 40 | 4.5 | 15.5 | 80 | 34,400 | | | |
| 10 | | 0.319 | 40 | 5.5 | 15.5 | 80 | 33,200 | | | |
| 11 | | 0.910 | 40 | 5¾ | 15.5 | 80 | 39,000 | | | |
| 12 | | 0.364 | 40 | 1¼ | 15.5 | 80 | 49,000 | | | |
| 13 | | 0.683 | 40 | 5.5 | 15.5 | 80 | 50,200 | | | |
| 14 | | 0.341 | 20 | 5.5 | 17.5 | 80 | 63,500 | | | |
| 15 | | 0.683 | 40 | 4.5 | 13 | 83 | 52,500 | | | |

ATLAC-382

| 16 | | 0.569 | 50 | 11 | 12 | 112 | 46,700 | 72 | 100 | 45,500 |
| 17 | | 0.569 | 50 | 28 | 19 | 112 | 48,000 | 72 | 100 | 46,100 |
| 18 | | 0.455 | 40 | 6 | 9 | 100 | 48,800 | 72 | 100 | 50,500 |
| 19 | | 0.569 | 50 | 21 | 23 | 110 | 42,100 | 72 | 100 | 40,200 |

[1] Phenyl beta-naphthylamine.
[2] Society Plastics Industries.
[3] 2-methyl-5-vinylpyridine.

In all of these runs, 65 parts of alkyd resin per 100 parts total ingredients were used. As is shown by the analysis, the Atlac-LV is more highly chlorinated than is the Atlac-382. The monomer was either styrene, butyl methacrylate, a mixture of styrene and 2-methyl-5-vinylpyridine, a mixture of styrene and 2-vinylpyridine, or a mixture of butyl methacrylate and 2-methyl-5-vinylpyridine. From the above data the polyester resin-monomer in the absence of any heterocyclic nitrogen containing monomer gave laminates of flexural strengths between 35,000 and 40,000 p.s.i. When as much as 5 parts of the other monomer was a heterocyclic nitrogen containing compound, laminates of flexural strengths of 45,000 to above 60,000 p.s.i. were obtained depending upon the type and amount of heterocyclic nitrogen containing compounds.

This invention has been illustrated in some of its preferred embodiments. Those skilled in the art will see many modifications which can be made without departing from the scope of this invention. It is obvious that fabric or fillers other than glass fabric can be used in the preparation of laminates. Finely divided filler can be used in casting resins etc. all of which is well known in the art.

I claim:

1. A composition of matter comprising the polymerized product of 10 to 90 weight parts per 100 parts copolymerizable material of an aliphatic unsaturated polyester resin comprising the reaction product of a glycol and an alpha, beta aliphatic ethylenic unsaturated dicarboxylic acid and the remaining copolymerizable material being a mixture of 2 to 90 weight percent of a heterocyclic nitrogen compound selected from the group consisting of vinyl substituted pyridines, isopropenyl substituted pyridines, vinyl substituted quinolines and isopropenyl substituted quinolines and a third monomer selected from the group consisting of polymerizable ethylenic unsaturated aromatic and nonconjugated aliphatic monomers.

2. A casting composition comprising an aliphatic unsaturated polyester resin comprising the reaction product of a glycol and an alpha, beta aliphatic ethylenic unsaturated dicarboxylic acid, a heterocyclic nitrogen containing monomer selected from the group consisting of vinyl substituted pyridines, isopropenyl substituted pyridines, vinyl substituted quinolines and isopropenyl substituted quinolines, and a third copolymerizable material selected from the group consisting of ethylenic unsaturated aromatic and nonconjugated aliphatic monomers wherein said polyester resin comprises 10 to 90 weight parts per 100 parts of copolymerizable materials and the heterocyclic nitrogen containing monomer comprises 2 to 90 weight percent of the remaining copolymerizable materials.

3. A polymeric composition of matter comprising (a) 10 to 90 weight parts per 100 parts of polymer of an unsaturated polyester resin having a molecular weight not in excess of 8000, said resin comprising the esterification product of a glycol containing not more than 15 carbon atoms and wherein such glycols comprise at least 95 weight percent of the alcohols in preparing said resin and an alpha, beta aliphatic ethylenic unsaturated dicarboxylic acid wherein such alpha, beta-dicarboxylic acids comprise at least 75 weight percent of the acids in preparing said resin; and (b) 10–90 weight parts per 100 parts polymer of a mixture of a (1) heterocyclic nitrogen containing monomer selected from the group consisting of vinyl substituted pyridines, isopropenyl substituted pyridines, vinyl substituted quinolines and isopropenyl substituted quinolines with a (2) copolymerizable monomer selected from the group consisting of ethylenic unsaturated aromatic monomers and nonconjugated aliphatic copolymerizable monomers and wherein the heterocyclic nitrogen monomer comprises 2 to 90 weight percent of said mixture.

4. The composition of claim 3 wherein the heterocyclic nitrogen containing monomer is 2-methyl-5-vinylpyridine and the copolymerizable monomer is styrene.

5. The composition of claim 3 wherein the heterocyclic nitrogen containing monomer is 2-vinylpyridine and the copolymerizable monomer is styrene.

6. A casting composition comprising 10 to 90 weight parts per 100 parts total ingredients of an aliphatic ethylenic unsaturated polyester resin of a polyhydric alcohol and an ethylenic unsaturated aliphatic polycarboxylic acid and the remaining copolymerizable material being a mixture of heterocyclic nitrogen containing monomeric material selected from the group consisting of vinyl substituted pyridines, isopropenyl substituted pyridines, vinyl substituted quinolines and isopropenyl substituted quinolines with a copolymerizable monomer selected from the group consisting of ethylenic unsaturated aromatic monomers and nonconjugated aliphatic copolymerizable monomers and wherein the heterocyclic nitrogen monomer comprises 2 to 90 weight percent of said mixture; and where said monomers have 2 to 100 mol percent based on the nitrogen containing polymer of a quaternizing agent incorporated therein.

7. The composition of claim 6 wherein a peroxide polymerization catalyst and a cobalt salt promoter is incorporated in said casting compositon.

8. The composition of claim 7 wherein the quaternizing agent is selected from the group consisting of alkyl halides, alkylene halides, and cycloalkyl halides containing at least one hydrogen attached to a carbon atom, and aromatic halides.

9. The composition of claim 8 wherein the unsaturated polyester resin comprises 30 to 90 weight parts per 100 weight parts polymerizable material, the nitrogen containing monomer is 2-methyl-4-vinylpyridine and the other copolymerizable monomer in the mixture is styrene.

10. The composition of claim 9 wherein the cobalt salt is cobalt naphthenate and the quaternizing agent is benzal chloride.

11. The composition of claim 9 wherein the cobalt salt is cobalt naphthenate and the quaternizing agent is diethyl bromomalonate.

12. A method of preparing a cast thermoset polymeric article of high flexural strength which comprises blending (a) 30 to 80 weight parts per 100 parts of coreactive material of an aliphatic unsaturated poylester resin having a molecular weight not in excess of 8000, said resin comprising the esterification product of a glycol containing not more than 15 carbon atoms and wherein such glycols comprise at least 95 weight percent of the alcohols in preparing said resin and an alpha, beta ethylenic aliphatic unsaturated dicarboxylic acid wherein such alpha, beta-dicarboxylic acid comprise at least 75 weight percent of the acids in preparing said resin; and (b) 20 to 70 weight parts per 100 parts co-reactive material of a mixture of a heterocyclic nitrogen containing monomer selected from the group consisting of vinyl substituted pyridines, isopropenyl substituted pyridines, vinyl substituted quinolines and isopropenyl substituted quinolines and a third polymerizable material selected from the group consisting of ethylenic unsaturated aromatic monomers and nonconjugated aliphatic copolymerizable monomers and wherein the heterocyclic nitrogen containing monomer comprises 2 to 90 percent of said mixture; incorporating a polymerization catalyst as the last ingredient in said blend; casting said blend; and curing said blend.

13. A method of preparing a thermoset laminate of high flexural strength which comprises blending 10 to 90 weight parts per 100 parts coreactive materials of a polyester resin of a polyhydric alcohol and an ethylenic unsaturated aliphatic polycarboxylic acid, 2 to 90 weight percent of the remaining material being a heterocyclic nitrogen base monomer selected from the group consisting of vinyl substituted pyridines, isopropenyl substituted pyridines, vinyl substituted quinolines and isopropenyl substituted quinolines, and a third polymerizable material selected from the group consisting of ethylenic unsaturated aromatic and nonconjugated aliphatic copolymerizable monomers coating a plurality of fabric sheets with the blend containing the compounding ingredients; superimposing the resulting coated sheets one on the other to form a plurality of plies; and subjecting the plies to a temperature in the range of 25 to 200° C. for a time sufficient to cause the said blend to set.

14. A method of preparing a thermoset plastic article of high flexural strength and of various colors which comprises blending 10 to 90 weight parts per 100 parts coreactive material of a polyester resin of a polyhydric alcohol and an ethylenic unsaturated aliphatic polycarboxylic acid, 2 to 90 weight percent of the remaining coreactive material being a heterocyclic nitrogen base monomer selected from the group consisting of vinyl substituted pyridines, isopropenyl substituted pyridines, vinyl substituted quinolines and isopropenyl substituted quinolines, and a third polymerizable material selected from the group consisting of ethylenic unsaturated aromatic and nonconjugated aliphatic copolymerizable monomers, incorporating a peroxide catalyst, a cobalt salt polymerization promoter and a quaternizing agent equivalent to 2 to 100 mol percent based on the heterocyclic base monomer, said quaternizing agent being selected from the group consisting of alkyl halides, alkylene halides, and cycloalkyl halides containing at least one hydrogen attached to a carbon atom and aromatic halides; forming said article; and subjecting the formed article to a temperature in the range of 25 to 200° C. for a time sufficient to cause said article to set.

15. The method according to claim 14 wherein the heterocyclic base is 2-vinylpyridine, the third material is styrene, the polymerization promoter is cobalt naphthenate and the quaternizing agent is benzal chloride.

16. The method according to claim 14 wherein the heterocyclic base is 2-methyl-5-vinylpyridine, the third material is styrene, the polymerization promoter is cobalt naphthenate and the quaternizing agent is diethylbromomalonate.

17. The method according to claim 14 wherein the heterocyclic base is 2-methyl-5-vinylpyridine, the third material is styrene, the polymerization promoter is cobalt naphthenate and the quaternizing agent is benzal chloride.

References Cited in the file of this patent

UNITED STATES PATENTS

| | | |
|---|---|---|
| 2,452,669 | Levine | Nov. 2, 1948 |
| 2,510,503 | Kropa | June 6, 1950 |
| 2,528,168 | Paulsen | Oct. 31, 1950 |
| 2,600,457 | Wynstra | June 17, 1952 |
| 2,744,044 | Toulmin | May 1, 1956 |
| 2,813,086 | Robitschek et al. | Nov. 12, 1957 |